March 18, 1958 F. ZUBER 2,827,515

AUTOMATIC TELEPHONE ALARM SYSTEM

Filed July 18, 1952 3 Sheets-Sheet 1

Inventor
FRANCIS ZUBER
By: J. Delattre-Seguy
Attorney

AUTOMATIC TELEPHONE ALARM SYSTEM

Filed July 18, 1952 3 Sheets-Sheet 2

Inventor:
FRANCIS ZUBER
by: J. Delattre-Seguy
Attorney

Inventor:
FRANCIS ZUBER
by: [signature]
Attorney

United States Patent Office 2,827,515 Patented Mar. 18, 1958

2,827,515

AUTOMATIC TELEPHONE ALARM SYSTEM

Francis Zuber, Onex, near Geneva, Switzerland, assignor to Martin Frères, Geneva, Switzerland, a firm of Switzerland Application July 18, 1952, Serial No. 299,608

Claims priority, application Switzerland July 18, 1951

8 Claims. (Cl. 179—5)

The present invention has for its object a system for the automatic delayed transmission of previously recorded telephone signals, the signals being transmitted from a calling station to at least one called station.

The system according to the invention is characterized by the fact that it includes at least one relay detecting conditions corresponding to the signals to be transmitted, at least one record member on which are recorded the call number of the station to be called and the signal to be transmitted, at least one device for scanning said record-carrying member associated with means generating current impulses under the action of such a scanning, the release of said device being controlled by the detecting relay, means for coupling the impulse generator and the detecting relay with the line connecting the two stations between which the transmission is to be performed and lastly a control relay governed respectively by the detecting relay and by the impulse generator and adapted to transmit through the line connecting the calling and called stations and to the latter its call number together with the signals previously recorded on the record member.

Accompanying drawings illustrate by way of example two preferred embodiments of the object of the invention together with detail modifications thereof. In said drawings.

Figures 1, 10:
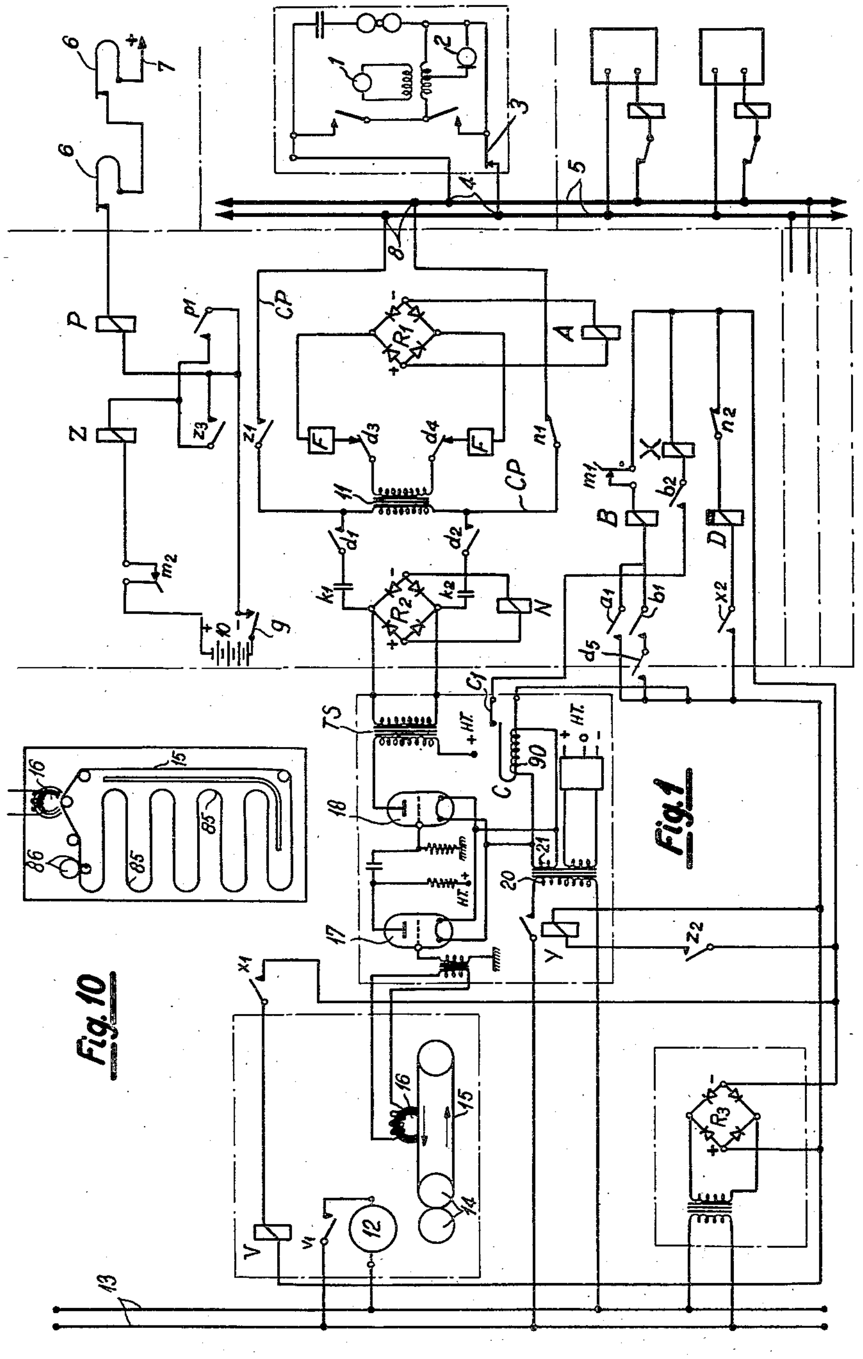
Fig. 1 is a general wiring diagram of a system incorporating the calling station, the exchange and the called station not being illustrated.
Fig. 10 is a highly diagrammatic elevational sectional view of a talking machine including a continuously moving record strip and a reading head.

In the system illustrated in Fig. 1, the calling station is provided with a standard telephone including receivers 1, a microphone 2 and a call-forming switch 3, said telephone being connected at 4 with the telephone line 5 leading to the exchange.

This system is adapted to transmit automatically an alarm or warning signal to a police station, to a detective or to a maintenance staff that is connected with the exchange. To this end, it is provided with a plurality of detecting switches 6 that may be controlled mechanically e. g. by the breaking of burglars into the premises. These switches 6 are normally closed and form part of the circuit energizing a detecting relay P and including a pilot wire 7 and an independent supply of current 10. In case of emergency, at least one of the switches 6 opens and the deenergized relay P lets the armature carrying the switch *p*1 drop, whereby said switch *p*1 enters its operative position for which it closes the circuit of the alarm relay Z. A hand-controlled switch *m*2 is inserted in the circuit of the relay Z and a battery switch *g* is inserted in the portion of the feed circuit that is common to the relays Z and P. This alarm relay Z controls a switch *z*3 shunting the switch *p*1 to keep the relay Z permanently energized and it also controls a main coupling switch *z*1 inserted in the main coupling circuit CP that is connected at 8 with the telephone line 5.

The main coupling circuit CP includes in particular a preparation switch constituted by the above mentioned main coupling switch *z*1 and that is controlled by the alarm relay Z and therefore by the detecting relay P; the coupling circuit also includes a call-forming switch *n*1 and also the primary of an induction coil 11 tuned to the frequency of the "unengaged" signal sent out by the exchange. The secondary of said coil 11 is connected through the switches *d*3 and *d*4 controlled by a relay D with a filtering circuit FF that is also tuned to the frequency of the "unengaged" signal; said filtering circuit FF feeds a rectifier R, the rectified current produced by which is sent into a primary relay A.

The arrangement illustrated in Fig. 1 includes also a motor 12 connected with the mains 13 and driving through a gear 14 a magnetic record strip 15. An electromagnetic reader 16 adapted to scan the strip 15 is connected through an output transformer or preferably through a capacitory connection with the control grid of the first tube 17 of a thermo-ionic amplifier. The second tube 18 of said amplifier is connected through its anode with the primary of an output transformer TS, the secondary of which is connected with a rectifier R2 feeding rectified current to a highly sensitive relay N operating above a threshold intensity or voltage. The secondary of the transformer TS feeds the main coupling circuit CP through condensers *k*1, *k*2 and switches *d*1, *d*2 controlled by the relay D.

The tube amplifier 17—18 which generates alternating current impulses under the action of the scanning of the magnetic strip 15 is energized through a feed transformer 20 having a secondary winding 21 that serves for heating the tube filaments.

A thermostatic switch C inserted in the heating circuit is operative only when the filaments of the tubes 17—18 are hot.

The rectifier R3 fed by the mains 13 produces the rectified current required for energizing the different controlling relays V, Y, B, X, D, the parts played by which will be disclosed hereinafter.

Figures 2, 3, 4, 5, 6:
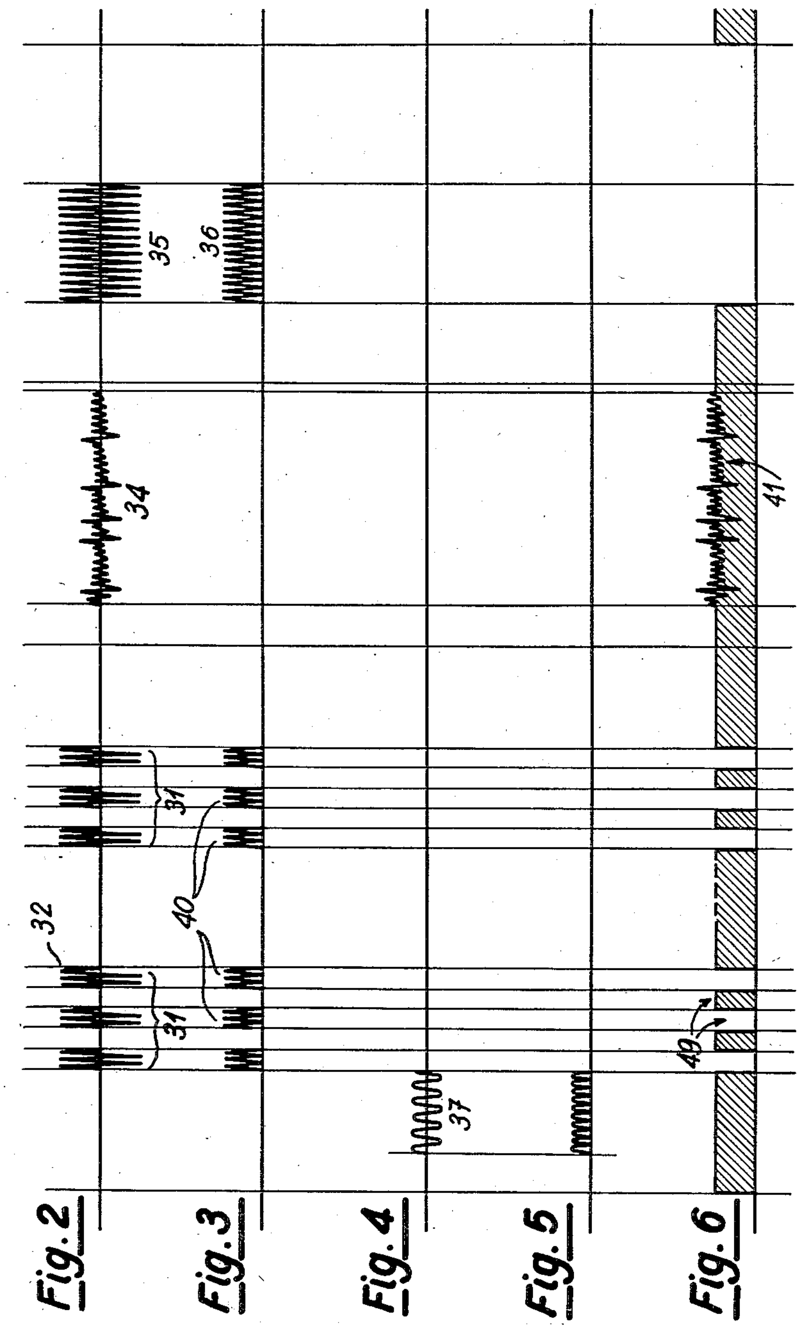
Fig. 2 is a diagram of a magnetizing curve of the magnetic record strip, not taking into account the high frequency currents corresponding to premagnetization or to biasing.
Fig. 3 is a diagram showing the variations of the rectified current passing through a relay operating above a threshold.
Fig. 4 is a diagram showing the variations of the modulated current corresponding to the "unengaged" signal from the exchange or from the calling station.
Fig. 5 is a diagram illustrating the variations of the rectified current passing through a primary relay and produced by the transmission of the "unengaged" signal.
Fig. 6 is a simplified signal illustrating the passage of direct current impulses through the line when the calling station detects alarming conditions, composes the call number and transmits the message.

The variations in the magnetization of the record strip 15 considered longitudinally include as shown in Fig. 2 inside a first area 21 wave trains 32 of considerable amplitude, the durations and intervals between which correspond with the execution of the characteristic pulses of a telephone call number or service order; a little beyond said first area is provided a second area 34 showing varying waves that reproduce the recorded message to be transmitted to the called station and lastly a third area corresponding to a single wave train 35 lasting a comparatively long time and forming the signals defining the end of the message.

The wave trains 32 and 35 have a much greater amplitude than the maximum amplitude of the actual variable signal waves 34.

The arrangement described operates in the following manner:

In a first stage and at the beginning of an attempted house-breaking, the switches 6 are actuated and open the circuit of the detecting relay P which releases its armature; the switch *p1* is thus returned into its operative position and energizes the alarm relay Z; consequently the switch *z1* attracted by the relay Z closes the main coupling circuit CP and connects the system with the exchange through the primary of the induction coil 11 and the number-forming switch *n1* that is closed. The feeding of the main circuit is thus obtained and allows holding the automatic parts of the exchange energized in the same manner as a subscriber's station, the receiver of which has been lifted. The relay Z has also closed the switch *z2* so as to energize the reproducing amplifier 17—18 through energization of the transformer 29 through the relay Y, as provided by the switch *z2*.

The relay C controlled by a bi-metallic thermostatic switch shows whether the amplifier filaments are hot and prevents by reason of the switch *c1* being still open, the number-formation from being performed too early. The second operative stage corresponds to the reception of the "unengaged" signal. After a fraction of a second, the exchange sends the subscriber's station the "unengaged" signal 37 (shown in Fig. 4); the alternating current corresponding to said signal produces in the secondary of the induction coil 11 a voltage which is tuned to the frequency of said "unengaged" signal. The current passes through the switches *d3* and *d4* and the filter F so as to energize the rectifier R1 and to produce at the output end of the latter a direct current voltage that energizes the primary relay A.

The relay A closes its switch *a1* whereby the intermediary relay B is energized through the manually closed switch *m1* and closes the switches *b1* and *b2* so as to prepare the subsequent energization of the intermediate relay X. As soon as the thermostatic relay C has reached the normal temperature of operation for the amplifier 17, 18, the switch *c1* closes and provides for energization of the relay X. The latter produces then a closing of the switch *x1* and consequently starts the motor 12 through energization of the control relay V. The switch *x2* closes then, so as to energize the relay D operating above a threshold of intensity and the release of which is delayed. The relay D, when energized, closes the switches *d1*, *d2* and *d5*. The switch *d5* serves for maintaining the energization of the relay B through the switch *b1*, the winding of the relay B and the manually closed switch *m1*. At the same time, the relay D opens the switches *d3* and *d4* and switches thus the energization of the primary relay A off. The switch *a1* opens, but the relay B remains energized through the said switches inserted in series at *d5*, *b1* and *m1*. These different operative steps form in association with the opening of the switches *d3* and *d4* the third stage of operation which serves for preparing the transmission of the call number of the called station.

The relay D, operating only above a threshold of intensity is delayed upon release so that its armature may not drop during the subsequent transmission of the call number in spite of the intermittent opening of the switch *n2* which beats at the rhythm of the impulses of the call number. The opening of the switches *d3* and *d4* has for its object to prevent the relay A from being subjected to the action of the transmission of the call number pulses. The secondary of the transformer 11, is thus no longer in circuit. This cuts out any weakening of the transmission of the impulses through a shunting of a fraction of the impulses through the circuit CP. The output terminals of the transformer TS are thus fed with modulated current so as to allow listening to the magnetic strip through the telephone receiver. The switches *d1* and *d2* close the transmission circuit through the secondary of the output transformer TS, the condensers *k1* and *k2*, the closed switches *d1*, *d2* and the closed switches *z1*, *n1*.

The fourth operative stage provides for the actual transmission of the number of the called station. The strip 15 begins unwinding and sends through the reading amplifier alternating current wave trains that are rectified, said trains corresponding to the number to be formed. These wave trains are amplified by the impulse generator 17—18 feeding the transformer TS, the secondary of which feeds alternating current to the input terminals of the rectifier R2. The more important fraction of these alternating impulses is rectified and transformed into continuous current pulses which energize the relay N. The latter, which executes beats at the rhythm of the impulses received, reconstitutes by breaks in the line at *n1* an image of the wave trains that have been recorded magnetically on the strip 15. The switch *n2* executes beats at the same rhythm without exerting any action on the relay D, the operation of which is delayed. Only a very small fraction of the alternating current impulses from the generator 17—18 is shunted into the circuit CP through the condensers *k1*, *k2*. The exchange that receives the impulses 49 (Fig. 6) corresponding to a series of makes and breaks in the direct current fed into the line establishes the connection with the corresponding subscriber; the latter, generally the police station, is rung up and lifts the telephone receiver.

The fifth operative stage corresponds to the transmission of the actual message. The magnetic strip has continued unwinding and the magnetic record 34 of the message is reproduced by a modulation 41 (Fig. 6) of the direct current sent by the exchange. As a matter of fact, the modulated signals pass through the reading head 16, the amplifier 17—18 and the output transformer TS and feed the line through *k1*—*k2*, *d1*—*d2*, *z1*—*n1*, the exchange and the called subscriber.

A part of the modulated current is lost in the rectifier R2 but has no action on N as the transmission level for the message 34 is much lower than the level of the impulses of the number-calling impulses 32.

The message is repeated several times by the strip 15 in order to provide for the case where the subscriber has not immediately lifted his telephone and consequently not been able to listen to the first words of the message.

The sixth operative stage corresponds to the end of the message. It is possible that disturbances may occur during the number-forming stage. The procedure should be repeated several times and, to this end, the strip 15 is provided at the end of the message with the record of an impulse 35 (Fig. 2) of a long duration, 20 to 30 times the duration of a number-forming impulse, said impulse 35 including a long series of alternating current magnetizing waves. This long impulse 35 of a considerable amplitude is rectified after it has passed through the output transformer TS by the rectifier R2. The latter sends into the relay N a long impulse of rectified current 36 (Fig. 3). The switches *n1*—*n2* open under the action of the relay N.

The circuit with the called subscriber is thus broken at *n1*, the parts at the exchange are again inoperative and are ready to begin the operation over again.

The switch *n2* remains open during a few seconds and, consequently, the delayed relay D drops back into its inoperative position and opens thus the circuit controlled by the switches *d1* and *d2*, while it closes the feed circuit of the relay A through the switches *d3* and *d4*. The switch *d5* opens the circuit of the relay B, since the switch *a1* is also open, so that the switches *b1* and *b2* open. The armature of the relay X drops consequently so as to stop the motor through deenergization of $x1$ and of $v1$ controlled thereby just before the number-forming signals recorded on the strip are about to appear again in register with the reading head, while the opening of the switch $x2$ prevents a reenergization of D.

The alarm switches 6 remaining open, the relay Z remains energized. The switch $z1$ provides for connection of the circuit CP with the exchange while $z2$ remains closed and keeps the amplifier energized.

As soon as the signal corresponding to the end of operation has been transmitted, the circuits are ready to begin their operation over again with the difference that $c1$ is energized before $b2$ by reason of the amplifier being still hot and the procedure continues again indefinitely. This forms the seventh stage of operation.

Under normal circumstances the called police station sends policemen who then open the hand-operated safety switch $m2$ which switches off then the current from the alarm relay Z and produces mechanically the opening of the switch $m1$, whereby the relay B is deenergized. This forms the eighth stage. The whole system is then ready to resume its alarm-responsive conditions as soon as the hand-operated contact switches $m1$ and $m2$ have resumed their operative position.

In the case where the called station is engaged, the relay A becomes energized as soon as the first impulse corresponding to engagement reaches it and the whole procedure continues as a blank operation until the end of the signal corresponding to the end of the message passes, which allows beginning the operation over again.

Figure 7:
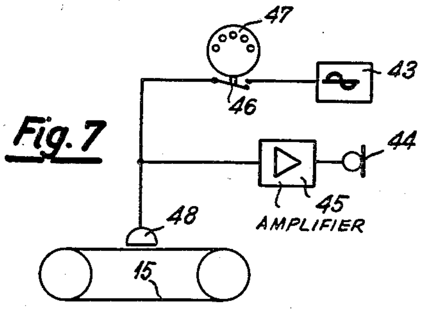
Fig. 7 is a wiring diagram that may be used for the recording purposes.
Figure 8:
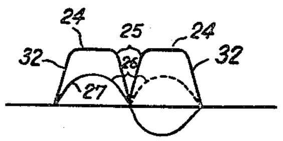
Fig. 8 is an elementary diagram showing the magnetic state of a recording strip.

The wiring diagram used for recording the different wave trains and the actual message on the magnetic strip 15 is shown in Fig. 7; it includes chiefly a source of alternating sinusoidal current 43, a microphone 44 associated with an amplifier 45, a current breaker 46 controlled by a number-forming dial or the like mechanism 47 and a magnetized head 48 in register with which the record strip 15 is wound continuously. The supply of current 43 cooperating with the parts 46—47 and 48 serves for magnetizing the strip 15 in accordance with the telephone number of the called station, while the microphone 44 records on said strip the message to be transmitted. The magnetizing head 48 produces a magnetic saturation of the strip 15 at the peaks 24 of the waves 32 (Fig. 8), whereby said peaks are somewhat flattened. The advantage thus provided resides in a reduction in the breadth of the trough 25 of the magnetizing curve 32 after rectification, as compared with the trough 26 of the rectified sinusoid illustrating the magnetizing current 27.

In the arrangement disclosed, the motor 12 driving the record strip, the impulse generator 17—18, the primary relay and the controlling relays are fed either directly or indirectly from the mains 13. It is possible for greater reliability to provide one or more independent supplies of current, such as a cell or a storage battery for instance, for feeding these different parts.

Figure 9:
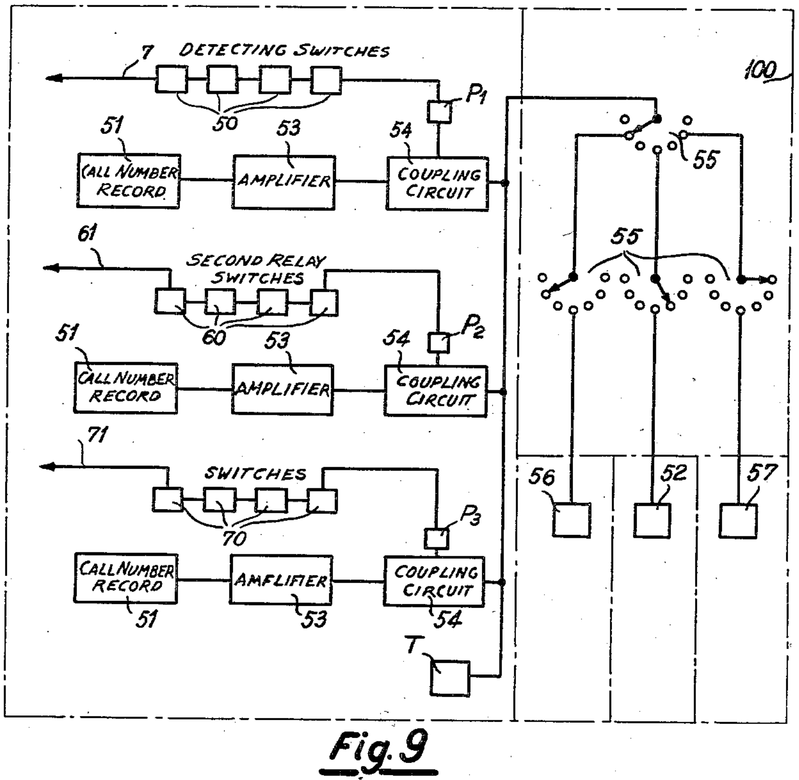
Fig. 9 is a highly diagrammatic one-wire diagram of a system adapted to transmit three different types of call signals to three different called stations.

The second embodiment illustrated in Fig. 9 is associated with a plant in which it is required to control from a distance and by night the operation of certain arrangements that are not being attended to by the staff. The telephone system includes a first detecting relay P1 in the circuit of which are inserted detecting switches 50 that are connected with a pilot wire and are adapted to become operative in case of failure or faulty operation of a section of the plant. A device 51 provided with a record strip 15 carries the call number of the station 52 of the foreman to be warned. The amplifier, which is similar to that illustrated in Fig. 1 is designated by the reference number 53 and the coupling circuit by the reference number 54. The telephone exchange 100 is connected automatically through a set of selectors 55 with the foreman's station 52, with the fire station 56 and with the police station 57.

The arrangement includes also a second detecting relay P2, the circuit of which includes switches 60 that are sensitive to any rapid modification in temperature or to the presence of smoke containing CO and $CO_2$ that ionize the atmosphere of the plant. These switches 60 are connected with a pilot wire 61 and are adapted to become operative in case of fire. The corresponding recording device 51 carries on the magnetic strip the telephone call number of the fire station 56 and the message giving the address of the location of the fire.

Lastly, a third detecting relay P3 is connected with switches 70 that are connected with a pilot wire 71 and that are adapted to become operative in the case of an attempted house-breaking. The magnetic strip of the corresponding reproducing and recording device 51 carries the telephone number of the police station 57 together with a message stating that somebody has entered the corresponding premises of the plant. T designates the standard calling station at the plant.

Figure 11:
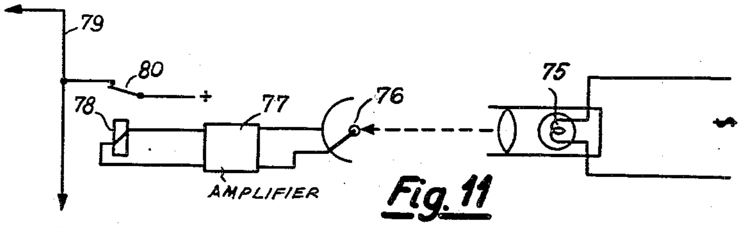
Fig. 11 is a wiring diagram of an alarm device adapted for use with the invention.

The alarm signal illustrated in Fig. 11 operates when an opaque body passes through the infra-red beam generated by a source of rays 75 and impinging normally on a photo-cell 76 that is connected with an amplifier 77 adapted in the case of an interception of said beam to make the alarm relay 78 operate. 79 designates a pilot wire that may be connected with a plurality of detecting switches such as 80 that are controlled by alarm relays similar to 78, that are controlled in their turn by other alarm devices.

The alarm-producing detecting means may be of any type different from those disclosed hereinabove. It is possible to mention by way of example and by no means in a limiting sense the detection operated through the mechanical opening of a switch, the shifting of a stretched nylon or the like thread, the cutting at a very high frequency of a wireless wave with the energization of a relay.

The talking machine illustrated in Fig. 10 allows using a long recording strip 15 inside a casing of reduced bulk, this being provided by giving this endless strip the shape of a number of loops facing alternately opposite directions and driven by rollers 86 so as to pass through a reading head 16.

The part carrying the record of the telephone call number of the call station and of the message to be transmitted may be constituted by a magnetic strip of definite length fed by a feeding reel to a take up reel, or again an open strip or a strip of indefinite length forming a simple loop or a reversed loop. The recording may also be performed on a wire of ferro-magnetic metal.

As a modification, the recording may be executed by engraving breadthwise or depthwise a strip carrying an opaque layer, the scanning being performed through the agency of a photo-cell.

It is obviously possible to resort to different recording means for the recording of the call number of the called station and for the actual signals to be transmitted; the called number may for instance be recorded on a perforated strip or on a rotary disc having gaps therein which correspond to the intervals between the wave trains forming the telephone number, said gaps being constituted by perforations or indentations of the disc.

The record strip may be constituted by a photographic film carrying a sound track of the variable density type or of the constant density and variable breadth type, said film progressing in register with a reading head incorporating a photo-electric cell.

As a modification, the part carrying the record of the called station and of the message may be constituted by a disc having engraved therein a sound groove extending breadthwise and adapted to be scanned by a reading needle or depthwise and adapted to be scanned by a sapphire reader.

The system may also include a mechanism for the direct mechanical reproduction of the telephone number of the called station, said mechanism being automatically actuated through the agency of the detecting and controlling relays.

What I claim is:

1. An automatic telephone alarm system for transmitting a message relating to predetermined alarm conditions from a calling station to an associated station having a given call number over a telephone line passing through an exchange adapted to produce a signal of non-engagement, said system comprising a detecting relay, means sensitive to the alarm conditions corresponding to such a message adapted to energize said relay, magnetic record means carrying a record of the call number of the associated station and a record of the message to be transmitted, a motor adapted to control the movement of the magnetic record means along a predetermined path, a control circuit for said motor, a stationary electromagnetic scanning device adjacent a point of said predetermined path and adapted to produce current impulses and modulations corresponding to said records of said magnetic record means scanned by this scanning device, an impulse amplifier having input terminals connected to said scanning device, and output terminals, a main coupling circuit connected with the telephone line, a preparation switch controlled by said detecting relay and inserted in said coupling circuit, a number-forming switch inserted in the coupling circuit to close and open the same in accordance with the impulses corresponding to the call number of the associated station, a threshold relay fed by the impulses from said amplifier and controlling said number-forming switch, a transformer tuned to the frequency of the signal of non-engagement sent by the exchange and including a primary winding inserted in the main coupling circuit and a secondary winding, a filtering circuit also tuned to the frequency of the signal of non-engagement and connected with said secondary, a primary relay inserted in said filtering circuit and adjusted to operate merely when the signal of non-engagement is received by said filtering circuit, at least one intermediate relay controlled by said primary relay, a switch inserted in the control circuit for said motor and controlled by said intermediate relay, coupling condensers connecting the output terminals of said amplifier and said primary winding of the transformer in said main coupling circuit.

2. An automatic telephone alarm system for transmitting a message relating to predetermined alarm conditions from a calling station to an associated station having a given call number through a telephone line passing through an exchange adapted to produce a signal of non-engagement, said system comprising a detecting relay, means sensitive to the alarm conditions corresponding to such a message adapted to energize said relay, magnetic record means carrying a record of the call number of the associated station and a record of the message to be transmitted, a motor adapted to control the movement of the magnetic record means along a predetermined path, a control circuit for said motor, a stationary electromagnetic scanning device adjacent a point of said predetermined path and adapted to produce current impulses and modulations corresponding to said records of said magnetic record means scanned by this scanning device, an impulse amplifier having input terminals connected to said scanning device, and output terminals, a heating circuit for said amplifier, a thermostatic switch controlled by last mentioned circuit, a main coupling circuit connected with the telephone line, a preparation switch controlled by said detecting relay and inserted in said coupling circuit, a number-forming switch inserted in the coupling circuit to close and open the same in accordance with the impulses corresponding to the call number of the associated station, a threshold relay fed by the impulses from the amplifier and controlling said number-forming switch, a transformer tuned to the frequency of the signal of non-engagement sent by the exchange and including a primary winding inserted in the main coupling circuit and a secondary winding, a filtering circuit also tuned to the frequency of the signal of non-engagement, switches controlling the connection between said secondary and said filtering circuit, a delayed relay controlling the opening of last mentioned switches, a rectifier inserted in the filtering circuit, a primary relay fed by last-mentioned rectifier, means controlled by the delayed relay and connecting the primary of the transformer with the output of the amplifier, the transmission of the signal of non-engagement by the exchange producing the actuation of the primary relay, a relay system controlled by the primary relay and controlling the delayed relay and adapted to close the circuit of the motor to provide for the transmission of the recorded call number and message through the coupling circuit and further through the telephone line into the associated called station, and means whereby the thermostatic switch controls the operation of one of said controlling relays to prevent the transmission until the thermostatic switch has reached a predetermined temperature.

3. An automatic telephone alarm system for transmitting a message relating to predetermined alarm conditions from a calling station to an associated station having a given call number through a telephone line passing through an exchange adapted to produce a signal of non-engagement, said system comprising a detecting relay, means sensitive to the alarm conditions corresponding to such a message adapted to energize said relay, magnetic record means carrying magnetically saturated portions constituting the record of the call number of the associated station and the modulated, unsaturated record of the message intended for the latter station, a motor adapted to control the movement of the magnetic record means along a predetremined path, a control circuit for said motor, a stationary electromagnetic scanning device adjacent a point of said predetermined path and adapted to produce current impulses and modulations corresponding to said records of said magnetic record means scanned by this scanning device, an electronic tube amplifier having input terminals connected to said scanning device, and output terminals, said amplifier being adapted to produce rectified wave trains corresponding to the transmission of the call number and alternating current modulated waves, the maximum amplitude of which is substantially lower than the constant amplitude of said rectified wave trains, for the transmission of the message, a first rectifier fed by the amplifier, means whereby the detecting relay starts the operation of the scanning means, a heating circuit for said amplifier, a thermostatic switch controlled by last mentioned circuit, a main coupling circuit connected with the telephone line, a preparation switch controlled by said detecting relay and inserted in said coupling circuit, a number-forming switch inserted in the coupling circuit to close and open the same in accordance with the impulses corresponding to the call number of the associated station, a threshold relay fed by said amplifier and controlling said number-forming switch when fed by the above-mentioned rectified wave trains, to operate said switch at the rhythm of said rectified wave trains, said number-forming switch remaining closed when the said modulated waves are being transmitted, the amplitude of which is not sufficient for the actuation of said threshold relay, a transformer tuned to the frequency of the signal of non-engagement sent by the exchange and including a primary winding inserted in the main coupling circuit and a secondary winding, a filtering circuit also tuned to the frequency of the signal of non-engagement, switches controlling the connection between said secondary and said filtering circuit, a delayed relay controlling the opening of last mentioned switches, a rectifier inserted in the filtering circuit, a primary relay fed by last mentioned rectifier, means controlled by the delayed relay and connecting the primary of the transformer with the output of the amplifier, condensers inserted between the terminals of the primary of the transformer and the output terminals of the amplifier, the transmission of the signal of non-engagement by the exchange producing the actuation of the primary relay, a relay system controlled by the primary relay and controlling the delayed relay and adapted to close the circuit of the motor to provide for the transmission of the recorded call number and message through the coupling circuit and further through the telephone line into the associated called station, and means whereby the thermostatic switch controls the operation of one of said controlling relays to prevent the transmission until the thermostatic switch has reached a predetermined temperature.

4. An automatic telephone alarm system for transmitting a message relating to predetermined alarm conditions from a calling station to an associated station having a given call number over a telephone line passing through an exchange adapted to produce a signal of non-engagement, said system comprising a detecting relay, means sensitive to the alarm conditions corresponding to such a message adapted to energize said relay, magnetic record means carrying magnetically saturated portions constituting the record of the call number of the associated station and the modulated, unsaturated record of the message intended for the latter station, a motor adapted to control the movement of the magnetic record means along a predetermined path, a control circuit for said motor, a stationary electro-magnetic scanning device adjacent a point of said predetermined path and adapted to produce current impulses and modulations corresponding to said records of said magnetic record means scanned by this scanning device, an electronic tube amplifier having input terminals connected to said scanning device, and output terminals, said amplifier being adapted to produce rectified wave trains corresponding to the transmission of the call number and alternating current modulated waves, the maximum amplitude of which is substantially lower than the constant amplitude of said rectifier wave trains, for the transmission of the message, a first rectifier fed by the amplifier, means whereby the detecting relay starts the operation of the scanning means, a heating circuit for said amplifier, a thermostatic switch controlled by last mentioned circuit, a relay controlling the heating circuit feeding the amplifier, an alarm relay controlling said heating relay to provide permanency of the feeding of the amplifier at the end of the message as long as the detecting relay is operative, a main coupling circuit connected with the telephone line, a preparation switch controlled by said detecting relay and inserted in said coupling circuit, a number-forming switch inserted in the coupling circuit to close and open the same in accordance with the impulses corresponding to the call number of the associated station, a threshold relay fed by said amplifier and controlling said number-forming switch when fed by the above-mentioned rectified wave trains, to operate said switch at the rhythm of said rectified wave trains, said number-forming switch remaining closed when the said modulated waves are being transmitted, the amplitude of which is not sufficient for the actuation of said threshold relay, a transformer tuned to the frequency of the signal of non-engagement sent by the exchange and including a primary winding inserted in the main coupling circuit and a secondary winding, a filtering circuit also tuned to the frequency of the signal of non-engagement, switches controlling the connection between said secondary and said filtering circuit, a delayed relay controlling the opening of last mentioned switches, a rectifier inserted in the filtering circuit, a primary relay fed by last-mentioned rectifier, means controlled by the delayed relay and connecting the primary of the transformer with the output of the amplifier, condensers inserted between the terminals of the primary of the transformer and the output terminals of the amplifier, the transmission of the signal of non-engagement by the exchange producing the actuation of the primary relay, a relay system controlled by the primary relay and controlling the delayed relay and adapted to close the circuit of the motor to provide for the transmission of the recorded call number and message through the coupling circuit and further through the telephone line into the associated called station, and means whereby the thermostatic switch controls the operation of one of said controlling relays to prevent the transmission until the thermostatic switch has reached a predetermined temperature, the controlling relays resuming automatically their operation and producing a repetition of the transmission of the recorded call number and message and end of message operation indefinitely as long as the alarm relay remains operative.

5. An automatic telephone alarm system for transmitting a message relating to predetermined alarm conditions from a calling station to an associated station having a given call number over a telephone line passing through an exchange adapted to produce a signal of non-engagement, said system comprising a detecting relay, means sensitive to the alarm conditions corresponding to such a message adapted to energize said relay, a magnetic record strip carrying at least one series of three successive areas separated from one another by intervals and constituted respectively by a plurality of magnetized magnetically saturated sections forming a record of the call number of the associated station, by a modulated signal corresponding to said message and by a continuous series of long magnetically saturated sections forming an end of message signal, a motor adapted to control the movement of the magnetic record strip along a predetermined path, a control circuit for said motor, a stationary electromagnetic scanning device adjacent a point of said predetermined path and adapted to produce current impulses and modulations corresponding to said three areas on said strip, an electronic tube amplifier having input terminals connected to said scanning device and output terminals, said amplifier being adapted to produce rectified wave trains corresponding to the transmission of the call number and alternating current modulated waves, the maximum amplitude of which is substantially lower than the constant amplitude of said rectifier wave trains, for the transmission of the message, a first rectifier fed by the amplifier, means whereby the detecting relay starts the operation of the scanning means, a main coupling circuit connected with the telephone line, a preparation switch controlled by said detecting relay and inserted in said coupling circuit, a number-forming switch inserted in the coupling circuit to close and open the same in accordance with the impulses corresponding to the call number of the associated station, a threshold relay fed by said amplifier and controlling said number-forming switch when fed by the above-mentioned rectified wave trains, to operate said switch at the rhythm of said rectified wave trains, said number-forming switch remaining closed when the said modulated waves are being transmitted, the amplitude of which is not sufficient for the actuation of said threshold relay, a transformer tuned to the frequency of the signal of non-engagement sent by the exchange and including a primary winding inserted in the main coupling circuit and a secondary winding, a filtering circuit also tuned to the frequency of the signal of non-engagement, switches controlling the connection between said secondary and said filtering circuit, a delayed relay controlling the opening of last mentioned switches, a rectifier inserted in the filtering circuit, a primary relay fed by last-mentioned rectifier, means controlled by the delayed relay and connecting the primary of the transformer with the output of the amplifier, condensers inserted between the terminals of the primary of the transformer and the output terminals of the amplifier, the transmission of the signal of non-engagement by the exchange producing the actuation of the primary relay, a relay system controlled by the primary relay and controlling the delayed relay and adapted to close the circuit of the motor and release same after the end of the message, the delayed relay being deenergized during the end-of-message impulse.

6. An automatic telephone alarm system for transmitting a message relating to predetermined alarm conditions from a calling station to an associated station having a given call number over a telephone line passing through an exchange adapted to produce a signal of non-engagement, said system comprising a detecting relay, means sensitive to the alarm conditions corresponding to such a message adapted to energize said relay, magnetic record means including an endless wire, forming a number of loops facing alternately opposite directions and carrying a record of the call number of the associated station and a record of the message to be transmitted, a motor adapted to control the movement of the magnetic record wire along a predetermined path, a control circuit for said motor, a stationary electromagnetic scanning device adjacent a point of said predetermined path, rollers adapted to drive the endless wire forming the record means through the scanning device to produce current impulses and modulations corresponding to said records of said magnetic record means scanned by this scanning device, an impulse amplifier having input terminals connected to said scanning device, and output terminals, a main coupling circuit connected with the telephone line, a preparation switch controlled by said detecting relay and inserted in said coupling circuit, a number-forming switch inserted in the coupling circuit to close and open the same in accordance with the impulses corresponding to the call number of the associated station, a threshold relay fed by the impulses from said amplifier and controlling said number-forming switch, a transformer tuned to the frequency of the signal of non-engagement sent by the exchange and including a primary winding inserted in the main coupling circuit and a secondary winding, a filtering circuit also tuned to the frequency of the signal of non-engagement and connected with said secondary, a primary relay inserted in said filtering circuit and adjusted to operate merely when the signal of non-engagement is received by said filtering circuit, at least one intermediate relay controlled by said primary relay, a switch inserted in the control circuit for said motor and controlled by said intermediate relay, and coupling condensers connecting the output terminals of said amplifier with said primary winding of the transformer in said main coupling circuit.

7. An automatic telephone alarm system for transmitting a message relating to predetermined alarm conditions from a calling station to an associated station having a given call number over a telephone line passing through an exchange adapted to produce a signal of non-engagement, said system comprising at least one detector relay adapted to be operated under alarm conditions corresponding to the message to be transmitted and including an energizing winding, an independent supply of current, a pilot wire connecting said supply with said winding, a plurality of shunt connected wires with respect to said pilot wire, a switch inserted in each shunt wire, a plurality of detecting means adapted to operate selectively the several switches to control the detector relay independently, record means carrying the record of the call number of said associated station and the record of the message intended for the latter, a motor adapted to move said record means along a predetermined path, a stationary scanning device adjacent a point of said predetermined path, an amplifier connected to the scanning means, and adapted to produce current impulses and modulations corresponding to the records scanned by said scanning device, means for coupling the output of said amplifier with the telephone line connecting the two stations and controlling relays controlled respectively by the detector relay and by the amplifier and adapted to provide for the transmission of the recorded call number and of the message to the associated station through the line connecting the calling station with said called station.

8. An automatic telephone alarm system for transmitting a message relating to predetermining alarm conditions from a calling station to an associated station having a given call number over a telephone line passing through an exchange adapted to produce a signal of non-engagement, said system comprising a detecting relay, means sensitive to the alarm conditions corresponding to such a message adapted to energize said relay, magnetic record means carrying a record of the call number of the associated station and a record of the message to be transmitted, a motor adapted to control the movement of the magnetic record means along a predetermined path, a control circuit for said motor, a stationary electromagnetic scanning device adjacent a point of said predetermined path and adapted to produce current impulses and modulations corresponding to said records on said magnetic record means scanned by this scanning device, an impulse amplifier having input terminals connected to said scanning device, and output terminals, a main coupling circuit connected with the telephone line, a preparation switch controlled by said detecting relay and inserted in said coupling circuit, a number-forming switch inserted in the coupling circuit to close and open the same in accordance with the impulses corresponding to the call number of the associated station, a threshold relay fed by the impulses from said amplifier and controlling said number-forming switch, a transformer tuned to the frequency of the signal of non-engagement sent by the exchange and including a primary winding inserted in the main coupling circuit and a secondary winding, a primary relay normally fed by the said secondary winding, and adapted to be operated by a signal of non-engagement from the exchange feeding it upon closing of the coupling circuit, relays controlled by the primary and detecting relays and adapted to control the operation of the motor circuit and of the amplifier, and a delay relay controlled by one of last mentioned relays and by the threshold relay and adapted upon energization to disconnect the transformer winding with reference to the primary relay and to connect its primary with the output of the amplifier to operatively connect the latter with the line for transmission of the message.

References Cited in the file of this patent

UNITED STATES PATENTS

| | | |
|---|---|---|
| 2,084,242 | Cassel | June 15, 1937 |
| 2,131,565 | Lauersdorg | Sept. 27, 1938 |
| 2,371,051 | Kendig | Mar. 6, 1945 |
| 2,399,229 | Jacobson | Apr. 30, 1946 |
| 2,404,842 | Hockstra | July 30, 1946 |
| 2,469,278 | Sears | May 3, 1949 |